US006703434B2

United States Patent
Dotson

(10) Patent No.: US 6,703,434 B2
(45) Date of Patent: Mar. 9, 2004

(54) METHODS OF PRODUCING HIGHLY NUCLEATED SYNDIOTACTIC POLYPROPYLENE

(75) Inventor: Darin L. Dotson, Spartanburg, SC (US)

(73) Assignee: Milliken & Company, Spartanburg, SC (US)

(*) Notice: Subject to any disclaimer, the term of this patent is extended or adjusted under 35 U.S.C. 154(b) by 0 days.

(21) Appl. No.: 10/121,224

(22) Filed: Apr. 12, 2002

(65) Prior Publication Data

US 2003/0199658 A1 Oct. 23, 2003

(51) Int. Cl.[7] .................................................. C08F 5/15
(52) U.S. Cl. ........................ 524/108; 524/285; 524/286; 526/351
(58) Field of Search ............................... 524/108, 285, 524/286; 526/351

(56) References Cited

U.S. PATENT DOCUMENTS

| 3,207,739 | A |   | 9/1965 | Wales et al. ............. 260/93.7 |
| 4,892,851 | A |   | 1/1990 | Ewen et al. .............. 502/104 |
| 5,334,677 | A |   | 8/1994 | Razavi et al. ............ 526/114 |
| 5,476,914 | A |   | 12/1995 | Ewen et al. .............. 526/351 |
| 5,891,940 | A | * | 4/1999 | Chen et al. ............... 524/229 |
| 5,969,021 | A |   | 10/1999 | Reddy et al. ............. 524/229 |
| 2003/0073764 | A1 | * | 4/2003 | Zhao ........................ 524/108 |

* cited by examiner

Primary Examiner—David W. Wu
Assistant Examiner—William Cheung
(74) Attorney, Agent, or Firm—Terry T. Moyer; William S. Parks

(57) ABSTRACT

The present invention relates to methods of producing syndiotactic polypropylene articles through high performance nucleation via the presence of certain novel nucleating agents within molten syndiotactic resins, and subsequently permitting the resultant molten mixture to cool into a selected shape or configuration. Such novel nucleating agents are new classes of hyper-nucleators that promote crystallization within such target syndiotactic resins at levels well above any previously disclosed nucleators. This invention thus also encompasses the articles and compositions of such nucleated syndiotactic polypropylene as well.

6 Claims, 1 Drawing Sheet

DSC THERMOGRAM OF MELTING TRANSITIONS OF s-PP WITH VARIOUS NUCLEATING AGENTS

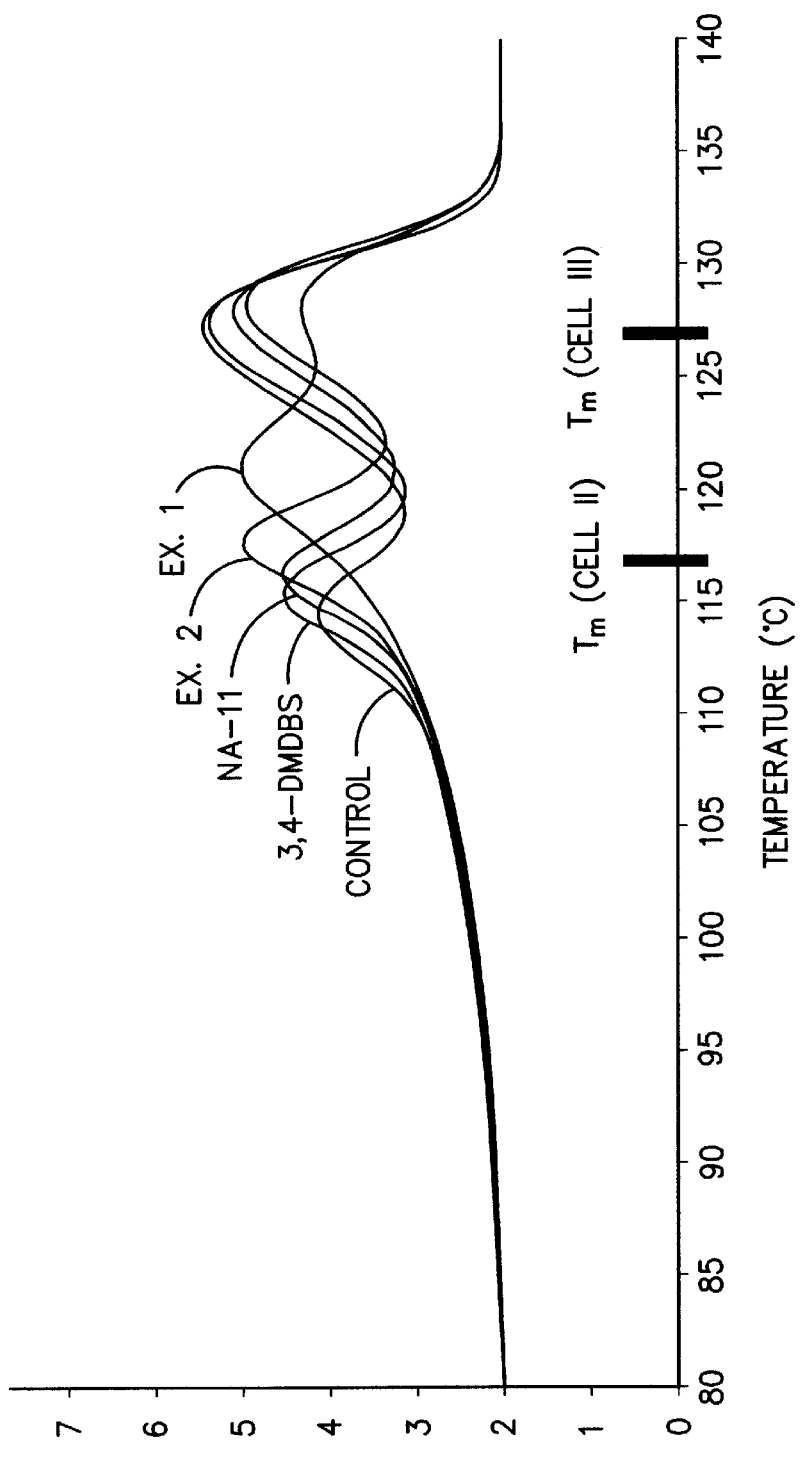

METHODS OF PRODUCING HIGHLY NUCLEATED SYNDIOTACTIC POLYPROPYLENE

FIELD OF THE INVENTION

The present invention relates to methods of producing syndiotactic polypropylene (s-PP) articles through high performance nucleation via the presence of certain novel nucleating agents within molten syndiotactic resins, and subsequently permitting the resultant molten mixture to cool into a selected shape or configuration. Such novel nucleating agents are a new class of nucleators that promote crystallization within such target syndiotactic resins at levels well above any previously disclosed nucleators. This invention thus also encompasses the articles and compositions of such syndiotactic polypropylene as well.

BACKGROUND OF THE PRIOR ART

All U.S. patents cited below are herein entirely incorporated by reference.

Polypropylene has long been known to exist in several forms. Generally, isotactic propylene (iPP) can be described as having the methyl groups attached to the tertiary carbon atoms of successive monomeric units on the same side of a hypothetical plane through the polymer chain, whereas syndiotactic polypropylene (sPP) may generally be described as having the methyl groups attached on alternating sides of the polymer chain. More specifically, the isotactic structure is typically described as having the methyl groups attached to the tertiary carbon atoms of successive monomeric units on the same side of a hypothetical plane through the main chain of the polymer, e.g., the methyl groups are all above or all below the plane. A more thorough description of syndiotactic polypropylene is found in col. 1, line 19 of col. 3 of U.S. Pat. No. 5,969,021 to Reddy et al., particularly in comparison with the general configurations of isotactic polypropylene. Thus, syndiotactic polymers, in contrast to the isotactic structure, are those in which the methyl groups attached to the tertiary carbon atoms of successive monomeric units in the chain lie on alternate sides of the plane of the polymer, thereby creating a configuration of successive methyl groups on alternate sides of a common plane (i.e., racemic dyads). The percentage of racemic dyads in the chain thus determines the degree of syndiotacticity of the polymer. Syndiotactic polymers are crystalline and, like the isotactic polymers, are insoluble in xylene (although the degree of crystallinity of s-PP is much less than for i-PP). This crystallinity distinguishes both syndiotactic and isotactic polymers from an atactic polymer which is amorphous, and soluble in xylene. Atactic polypropylene exhibits no regular order of repeating unit configurations in the polymer chain and forms essentially a waxy product. Furthermore, s-PP exhibits a far lower melting point (~128° C.) than for i-PP (~153–170° C.).

Such noticeable physical differences in comparison with i-PP allow for utility of s-PP in specialized applications. For example, syndiotactic polypropylene provides such improved characteristics over isotactic types, namely, but not limited to, clarity, toughness (impact resistance), and feel (softness), as well as surface smoothness and uniformity, some improvements to an extraordinary degree. Thus, end-uses such as dental retainers, medicine droppers, eye droppers, and pen caps normally include s-PP as the primary polymer. However, historic utilization of such a polymer within other fields has been severely limited due to problems associated with low crystallization rates and crystallization temperatures (and thus inordinate cost levels), as well as low flexural modulus characteristics.

As noted within the citation to Reddy et al., above, the crystallization rate of syndiotactic polypropylene is much slower than that for isotactic PP due the low retention rate of crystallinity exhibited by syndiotactic polypropylene in general. In fact, syndiotactic polypropylene continues to crystallize even after pelletization thereof during the production of the resin throughout the process. Furthermore, such low crystallization temperatures also require cooling of injection molded parts or extruded films or sheets to much lower temperatures, and in some cases, higher than needed, for example, for isotactic polypropylene, thereby adding to the cost of manufacture as well due to slower production rates and increased energy costs. Additionally, not only does syndiotactic polypropylene have crystallization temperatures and rates that could be improved, some common processing additives, such as calcium stearate, tend to reduce the crystallization rate even more.

Such slow crystallization rates are generally attributable to the fact that syndiotactic polypropylenes exhibit polymorphism; that is, three different crystal types, namely cell I, cell II, and cell III structures therein. Due to the inherent similarities between Cell I and Cell III, only Cell III will be referred to hereinafter. It has been traditionally noted that the manufacture of syndiotactic polypropylene requires two distinct steps after melting of the target resin in order for the crystal structures to change from one structure to another and finally to the desired final type (cell II). The initial crystal configuration, known as cell II (which includes anti-chiral helices along the "a" crystallographic axis and chiral helices along the "b" axis), appears quickly during cooling and is kinetically favored. The cell III crystal structure (which includes anti-chiral helices along both the "a" and "b" crystallographic axes) then forms at relatively high temperatures (thermodynamically favored) during cooling of the molten resin form. Such a cell III structure for syndiotactic polypropylene (higher melting), although formed more slowly, is always in competition with the Cell II form (lower melting), and is not desirable since it is a rubbery, opaque phase and cannot be pelletized during processing. In order to effectuate proper cell II formation, generally such rubbery cell III-type s-PP must then, in general non-limiting terms, be extruded into strands and wound around a spool to permit further cooling and thus generation of the necessary rigidifying cell II configuration. Thus, it appears that the crystallization rate of syndiotactic polypropylene is dictated by the amount of cell III crystals present and thus requiring generation and arrangement within the target polymer. Without intending on being limited to any scientific theory, it appears that proper and useful syndiotactic polypropylene articles should include higher amounts of the rigid cell II crystal types. The apparent problem in the past with slow crystallization procedures lies in the presence of large amounts of cell III crystals therein. A lower amount of such cell III crystal types would thus permit more thorough crystallization of the overall syndiotactic polypropylene during the initially formed cell II phase, thereby reducing the amount of time required for full crystallization thereof. As a result, it is believed that a syndiotactic polypropylene production method that generates higher amounts of cell II crystal structures than cell III types would exhibit faster crystallization (or at least higher crystallization temperatures) and thus would reduce the cost and complexity associated with producing syndiotactic polypropylene articles. In effect, then, such an improved method would permit more widepread use of such an excellent performing class of polypropylenes. As it is today, the dichotomy in melting forms between cell II and III crystal structures causes a processing problem in terms of complexity and time and thus such syndiotactic polypropylene types have proven very difficult to efficiently produce, even with certain nucleating agents present. Thus, as noted above, the need appears to be to reduce the amount of cell III present therein, thus permitting the cell II component to dictate polymer formation, preferably wherein more cell II form is produced than cell III crystals. Furthermore, it appears that a reduction in the amount of rubbery cell III crystals within target s-PP formulations leads to the formation of more flexurally stable end-product articles as well (e.g., the fewer rigid cell II crystals are present, the polypropylene tends to be more flexible and less susceptible to breaking). Unfortunately, to date no such specific advancement has been proffered to the syndiotactic polypropylene industry wherein the majority of s-PP crystals are Cell II.

Thus, in spite of the advancements in the prior art relating to syndiotactic polypropylene, there is a need for a method of improving the crystallization rate and temperature of syndiotactic polypropylene, in addition to the stiffness of final s-PP articles. As a result, then, there is also a need in the art for improving such characteristics, particularly in order to allow for utility of s-PP within larger market areas, particularly those which are today dominated by isotactic polypropylene. To date, no such advancements have been made available increasing the crystallization rates of syndiotactic polypropylene to levels acceptable to displace isotactic polypropylene as the base polymer in certain end-uses.

SUMMARY OF THE INVENTION

It is an object of the present invention to provide for a method of improving the crystallization rate and temperature of syndiotactic polypropylene. It is another object of the present invention to provide for a syndiotactic polypropylene having improved crystallization rate and temperature of syndiotactic polypropylene. It is even another object of the present invention to provide for products made from syndiotactic polypropylene having improved crystallization rate and temperature of syndiotactic polypropylene.

Accordingly, this invention encompasses a method of treating syndiotactic polypropylene comprising the step of compounding syndiotactic polypropylene with at least one compound selected from the group consisting of compounds conforming with either of formulae (I) or (II)

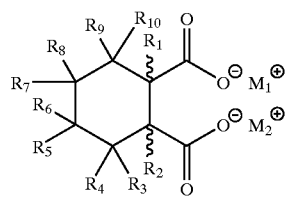

(I)

wherein $M_1$ and $M_2$ are the same or different or are combined to form a single moiety and are selected from at least one metal cation (such as, without limitation, sodium, potassium, calcium, strontium, lithium, and monobasic aluminum), and wherein $R_1$, $R_2$, $R_3$, $R_4$, $R_5$, $R6$, $R_7$, $R_8$, $R_9$, and $R_{10}$ are either the same or different and are individually selected from the group consisting of hydrogen, $C_1$–$C_9$ alkyl [wherein any two vicinal (neighboring) or geminal (same carbon) alkyl groups may be combined to form a carbocyclic ring of up to six carbon atoms], hydroxy, $C_1$–$C_9$ alkoxy, $C_1$–$C_9$ alkyleneoxy, amine, and $C_1$–$C_9$ alkylamine, halogens (fluorine, chlorine, bromine, and iodine), and phenyl, wherein geminal constituents may be the same except that such geminal constituents cannot simultaneously be hydroxy; and wherein geminal constituents may be different from each other, except that such geminal constituents may not be hydroxy and halogen or hydroxy and amine simultaneously;

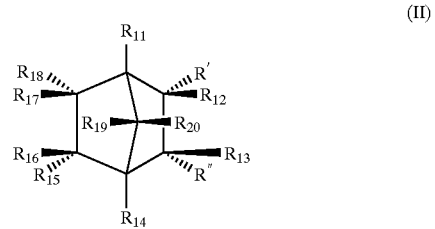

(II)

wherein $R_{11}$, $R_{12}$, $R_{13}$, $R_{14}$, $R_{15}$, $R_{16}$, $R_{17}$, $R_{18}$, $R_{19}$, and $R_{20}$ are individually selected from the group consisting of hydrogen, $C_1$–$C_9$ alkyl, hydroxy, $C_1$–$C_9$ alkoxy, $C_1$–$C_9$ alkyleneoxy, amine, and $C_1$–$C_9$ alkylamine, halogen, phenyl, alkylphenyl, and geminal or vicinal $C_1$–$C_9$ carbocyclic, wherein geminal constituents may be the same except that such geminal constituents cannot simultaneously be hydroxy; and wherein geminal constituents may be different from each other, except that such geminal constituents may not be hydroxy and halogen or hydroxy and amine simultaneously; wherein R' and R" are the same or different and are individually selected from the group consisting of hydrogen, $C_1$–$C_{30}$ alkyl, hydroxy, amine, polyoxyamine, $C_1$–$C_{30}$ alkylamine, phenyl, halogen, $C_1$–$C_{30}$ alkoxy, $C_1$–$C_{30}$ polyoxyalkyl, C(O)—$NR_{21}$C(O), and C(O)O—R''', wherein $R_{21}$ is selected from the group consisting of $C_1$–$C_{30}$ alkyl, hydrogen, $C_1$–$C_{30}$ alkoxy, and $C_1$–$C_{30}$ polyoxyalkyl, and wherein R''' alone or two adjacent R''' groups (such as when R' and R" are the same) are combined to from a single moiety which is selected from the group consisting of hydrogen, a metal ion (such as, without limitation, sodium, potassium, calcium, strontium, lithium, and monobasic aluminum), an organic cation (such as quaternary amines), polyoxy-$C_2$–$C_{18}$-alkylene, $C_1$–$C_{30}$ alkyl, $C_1$–$C_{30}$ alkylene, $C_1$–$C_{30}$ alkyleneoxy, a steroid moiety, phenyl, polyphenyl, $C_1$–$C_{30}$ alkylhalide, and $C_1$–$C_{30}$ alkylamine; and wherein at least one of R' and R" is either C(O)—$NR_{21}$C(O) or C(O)O—R'''. The term "monobasic aluminum" is well known and is intended to encompass an aluminum hydroxide group as a single cation bonded with the two carboxylic acid moieties. Furthermore, for Formula I, in each of these potential compounds, the stereochemistry at the metal carboxylates may be cis or trans, although cis is preferred. In Formula II, the stereochemistry at the R' and R" groups may be cis-exo, cis-endo, or trans, although cis-endo is preferred.

According to still another potential embodiment of the present invention, there is provided a method of forming a product including the step of heating a mixture comprising syndiotactic polypropylene and an additive above the melt temperature of the syndiotactic polypropylene to form a melted mixture, wherein the additive comprises at least one selected from the group consisting of compounds of either Formula (I) or (II), or mixtures thereof. The method also includes the step of forming the melted mixture into a desired shape, particularly a method wherein the shaped article is formed by cooling the desired shape to below the melt temperature of the syndiotactic polypropylene.

Further encompassed within this invention is a syndiotactic polypropylene article (wherein the definition of syndiotactic polypropylene can include the presence of up to about 30 weight percent isotactic, atactic, or mixtures thereof, polypropylene types), exhibiting a peak crystallization temperature (peak $T_c$) of at least 71° C., preferably at least about 74° C., when measured via differential scanning calorimetry (DSC) under a modified version of ASTM Test Method D-794-85, wherein the sample is cooled at a rate of 20° C. per minute, or alternatively, exhibits the same high peak crystallization temperature as well as a flexural modulus of at least 900 MPa as determined according to ASTM Test Method ASTM D790-98, procedure B. Lastly, this invention also encompasses a syndiotactic polypropylene that exhibits a greater amount of cell II crystal structures in comparison with cell III crystal structures within the same final polymer product, as measured via DSC analysis.

DETAILED DESCRIPTION OF THE INVENTION

As noted above, in order to develop a proper high crystallizing syndiotactic propylene to permit widespread commercial applications of such a unique polymer, a novel nucleating technology was developed that unexpectedly produces a range of amounts of cell II (lower melting) crystal formations from a slight excess to much greater levels in comparison with the amount produced of the cell III (higher melting) types. Surprisingly, such novel nucleators as noted below not only generated such greater amounts of higher cell II crystal structures, they also provided higher, and in some cases, extremely higher crystallization temperatures for target syndiotactic polypropylenes. As a result, efficiency has been increased and complexity has been reduced in relation to unnucleated syndiotactic polypropylene during processing. Also, such novel nucleators are compatible with common syndiotactic polypropylene additives.

Such inventive nucleating procedures thus encompass the addition of certain types of bicyclic or monocylic dicarboxylic acid salts or mono-salts (half-acid, half salt) compounds, noted above in terms of Formulae (I) or (II). The non-limiting preferred type of nucleating additive is a monocyclic diacid salt (such as cis-calcium hexahydrophthalate) that induces a peak crystallization temperature in excess of 74° C. for syndiotactic polypropylene containing about 70–80% racemic dyads. As noted below within the examples, such a high crystallizing nucleating procedure is a highly unexpected improvement over the standard procedures utilizing NA-11 as the standard nucleator. With the cost of such polypropylene already quite high (due to its manufacture via expensive metallocene catalysis), the utilization of such syndiotactic types have been avoided. The ability now to increase the efficiency of processing of such a specific polypropylene thus translates into not only lower costs to the consumer, but also the ability to potentially enter markets previously unavailable to such excellent polypropylene formulations and articles.

The syndiotactic polypropylene utilized in the present invention, and methods of making such a syndiotactic polypropylene, are well known to those of skill in the polyolefin arts. An example of a suitable syndiotactic polypropylene and a method of its making can be found in U.S. Pat. Nos. 4,892,851, 5,334,677, and 5,476,914, all herein entirely incorporated by reference.

Preferably, the syndiotactic polypropylene utilized in the present invention comprises tacticity of at least 70 percent racemic dyad molecules as defined by the percent of racemic dyads (i.e., an amount of isotactic or other type of non-syndiotactic polypropylene of at most about 30 weight percent). It is foreseen that desired syndiotactic polypropylene utilizing the inventive nucleation techniques will comprise syndiotacticity of at least 80 percent racemic dyads, even more preferably at least 83 percent racemic dyads, and still more preferably at least about 90 percent racemic dyads. Most preferably, such foreseen syndiotactic polypropylenes utilizing the present inventive nucleation techniques would consist of all syndiotactic molecules.

The syndiotactic polypropylene useful in the present invention will generally be selected according to the desired end use of polypropylene, for compatibility with the additives, and for compatibility with the processing conditions, and with any other polymers to be added thereto.

As a non-limiting example, a suitable syndiotactic polypropylene which may be utilized in the present invention may generally be described as having a number average molecular weight in the range of about 30000 to about 150000, a weight average molecular weight in the range of about 60000 to 350000, a melting point in the range of about 95° C. to about 165° C., a bulk density in the range of about 0.28 to about 0.55 g/cc, polymer density in the range of about 0.87 to 0.90 g/cc, polydispersity in the range of about 2 to about 5, and a percent racemic dyad value between about 70–74 percent.

The particular compounds noted above, as proper nucleating agents present within such syndiotactic polypropylenes include any compound encompassed within the Formulae of (I) or (II), as defined above in detail. Preferably, for Formula (I), all of the R groups are hydrogen and the M groups are combined to form a calcium ion. For Formula (II), all the R groups, except R' and R", are hydrogens, and both R' and R" are carboxylic acids with the R'" groups individual sodium ions.

Such aforementioned nucleation properties within syndiotactic polypropylene are highly unexpected and unpredictable, particularly in view of the closest prior art, namely within U.S. Pat. No. 3,207,739 to Wales, as well as within Beck, H. N., "Heterogeneous Nucleating Agents for Polypropylene Crystallization," Journal of Applied Polymer Science, Vol. 11, pp. 673–685 (1967), which disclose disodium hexahydrophthalate as a possible, though not preferred, nucleator for polymers (such disclosures are directed more specifically to sodium benzoate and other like aromatic compounds as better nucleators), and WO 98/29494 which discloses nucleation and clarification additives for polyolefin articles including unsaturated [2.2.1] dicarboxylate salts; however, there is no exemplification of a saturated dicarboxylate (or similar saturated structure) of this type (other than heterocyclic camphanic acid). The closest embodiment within that art is identified as disodium bicyclo[2.2.1]hept-5-ene-2,3-dicarboxylate. None of these references discuss any nucleation advantages for the taught compounds in relation specifically to syndiotactic polypropylene to the degree herein realized. Most notably, the utilization of such compounds as noted above provide highly unexpected improvements in crystallization rates and temperatures, as well as stiffness and, perhaps, most importantly, the amount of cell II crystals formed within the target polymer in relation to the amount of cell III crystals therein. Again, the aforementioned prior art references fail to provide any motivation for the introduction of such compounds as encompassed within Formulae (I) and/or (II), above, within syndiotactic polypropylene. Thus, after intensive investigations, it has been determined that, quite unexpectedly, as discussed below in greater detail, the utilization of certain preferred, and non-limiting, metal hexahydrophthalates, and, to a lesser extent, the utilization of nucleating compounds produced through the hydrogenation of unsaturated bicyclic carboxylic acid salts, provide vastly improved nucleation results for syndiotactic polypropylenes to a level heretofore unattainable, particularly at a commercially viable level. As indicated in Table 1, below, as one example of this phenomenon, the peak crystallization temperatures provided the inventive syndiotactic polyolefin articles are from about 1 to as high as about 6° C. above that for the standard, previously best performing syndiotactic nucleator compounds. Such dramatic improvements are simply unexpected and are unpredictable from any known empirical or theoretical considerations and are of great practical significance as discussed before.

As noted above, proper nucleator compounds for industrial applications require a number of important criteria to be met, such as shelf stability, particularly in terms of low hygroscopicity, high final article stiffness, gas barrier properties, and plastic additive compatibility, such as stability in combination with acid scavengers, such as calcium stearate, for example. The compounds noted above in Formulae (I) and (II) appear to meet all of these important requirements very well. For instance, these inventive compounds do not hydrate readily and thus granular or powder formulations of such a salt do not agglomerate or clump together. The cost benefits from such shelf stability are apparent since there is little if any need to separate agglomerated powders upon introduction to thermoplastic processing equipment. Additionally, such nucleating salts provide high stiffness (modulus) characteristics to the overall final syndiotactic polyolefin product without the need for extra fillers and reinforcing agents, although such potentially unnecessary additives may be added if such are desired to improve the target properties therein. Lastly, and of great importance within the polypropylene industry, such inventive salts do not react deleteriously with calcium stearate co-additives. Such a property, combined with the other attributes, is highly unexpected and unpredictable.

The HHPA and/or bicyclic salts of Formula (I) and/or (II), above, are thus added within the target syndiotactic polypropylene in an amount from about 0.01 percent to 5.0 percent by weight, more preferably from about 0.02 to about 3.0 percent, and most preferably from about 0.05 to 2.5 percent, in order to provide the aforementioned beneficial characteristics (1.0% by weight equals about 10,000 ppm). It may also be desirable to include up to 50% or more of the active compound in a masterbatch, although this is not a restriction. Optional additives within the nucleating salt-containing composition, or within the final thermoplastic article made therewith, may include plasticizers, stabilizers, ultraviolet absorbers, and other similar standard thermoplastic additives. Other additives may also be present within this composition, most notably antioxidants, antimicrobial agents (such as silver-based compounds, preferably ion-exchange compounds such as ALPHASAN® antimicrobials from Milliken & Company), antistatic compounds, perfumes, chloride scavengers, and the like. These coadditives, along with the nucleating agents, may be present as an admixture in powder, liquid, or in compressed/pelletized form for easy feeding. The use of dispersing aids may be desirable, such as polyolefin (e.g., polyethylene) waxes, stearate esters of glycerin, montan waxes, and mineral oil. Basically, the nucleating compounds may be present (up to 20% by weight or more) in any type of standard additive form, including, without limitation, powder, prill, agglomerate, liquid suspension, and the like, particularly comprising the dispersing aids described above. Compositions made from blending, agglomeration, compaction, and/or extrusion may also be desirable.

Non-limiting commercially available products suitable for use in the practice of the present invention, in addition to the inventive nucleators noted above, include Millad® 3988 (3,4-dimethyldibenzylidene sorbitol), available from Milliken Chemical, NA-11® (sodium 2,2-methylene-bis-(4, 6, di-tert-butylphenyl)phosphate))), available from Asahi Denka Kogyo, and aluminum bis[2,2'-methylene-bis-(4,6-di-tert-butylphenyl)phosphate], which is hereinafter referred NA-21®, also available from Asahi Denka Kogyo.

The crystallization additive or additives may be added to the syndiotactic polypropylene during or after polymerization. Preferably, it is added to the syndiotactic polypropylene as it is being extruded through the extrusion die.

In the present invention, the syndiotactic polypropylene treated with the crystallization additive, will have a peak crystallization temperature that is improved as compared to the untreated syndiotactic polypropylene. Generally, the peak crystallization temperature of the treated syndiotactic polypropylene is in excess of about 71° C. (for syndiotactic polypropylene comprising about 70–75% syndiotacticity), preferably in excess of about 74° C. (for syndiotactic polypropylene comprising about 70–75% syndiotacticity), most preferably in excess of about 77° C. (by DSC analysis when a cooling rate of 20° C./minute is used).

The syndiotactic polypropylene crystallized according to the present invention will also have an increased content of cell II (low melting form) structure and a decreased content of cell III (high melting form) such that the amount of cell II at least about the same in amount as that of cell III (such as low as about 45% cell II correlated to about 55% cell III, although higher amounts of cell II are more highly desired for crystallization and manufacturing speed improvements).

Non-limiting examples of possible reinforcing agents which may be added to the target syndiotactic polypropylene include inorganic or organic products of high molecular weight, including glass fiber, asbestos, boron fibers, carbon and graphite fibers, whiskers, quartz and silica fibers, nanocomposites (such as Montmorillonite clays), and synthetic organic fibers. When such conventional ingredients are utilized, they will generally be present in a range from about 0.01 to about 50 weight percent of the blend, preferably in a range from about 1 to about 25 weight percent of the blend.

PREFERRED EMBODIMENTS OF THE INVENTION

The following Examples are provided merely to illustrate selected embodiments of the present invention and do not limit the scope of the claims.

Production of Inventive Salts

EXAMPLE 1

Cis-Calcium Hexahydrophthalate

To an 8-L cylindrical kettle fitted with a mechanical paddle stirrer and thermometer was added water (4 L) and calcium hydroxide (481 g, 6.49 moles) with stirring at room temperature. To this slurry was added cis-hexahydrophthalic anhydride (1 kg, 6.49 moles) and the slurry was heated to 50° C. After stirring with heat for 5 hours, the mixture became quite thick, at which time the pH of the aqueous phase was found to be about 7. The white product was collected by suction filtration, washed with copious amounts of water, dried in a vacuum oven overnight at 140° C., and further air-jet milled to provide a powder of roughly uniform particle sizes. The dry weight was 1270 grams (93% yield) having a melting point greater than about 400° C. The IR spectrum was consistent with that of the expected product.

EXAMPLE 2

Disodium bicyclo[2.2.1]heptane-2,3-dicarboxylate

To a solution of disodium bicyclo[2.2.1]hept-5-ene-2,3-dicarboxylate (10.0 g) in water (100 g) was added 0.5 g palladium on activated carbon (5 wt %). The mixture was transferred into a Parr reactor and was subjected to hydrogenation (50 psi, room temperature) for 8 hours. The activated carbon was filtered out, and the water was removed in vacuo at 75° C. The resulting product (m.p>300° C.) was dried and milled. NMR and IR analyses were consistent with that of the expected structure.

Base Polymers

The base s-PP fluff used for compounding had a racemic dyad content of between 70 and 80% and a MFR of about 4 g/10 min., and was unstabilized as received. For stabilization, it was compounded with an antioxidant package containing 500 ppm Irganox® 1010 (Ciba Geigy) {tetrakis-(methylene[3,5-di-tert-butyl-4-hydroxyhydrocinnamate]methane)} and 1000 ppm Irgafos® 168 (Ciba Geigy), plus the individual nucleating agents, either inventive or comparative in nature, as noted below. Calcium stearate (CaSt) was used at 800 ppm as the acid-acceptor, except in the case of NA-11 and sodium benzoate (NaBz), wherein dihydrotalcite (DHT4-A, Kyowa Chemical) was used at a level of 400 ppm. The compounded fluff was mixed thoroughly in a Welex mixer and extruded on a Prism 16mm twin-screw microextruder into strands. The strands were cooled on a spool to room temperature and pelletized using a laboratory pelletizer. Extrusion conditions were as follows: Zone 1, 370° F, Zone 2, 415° F., Zone 3, 435° F, and Zone 4 (die), 455° F. 1 kg batches of pellets were thus made in this manner.

Testing for nucleating effects and other important criteria were accomplished through the formation of 50 mil plaques from the pelletized syndiotactic polypropylene thermoplastic resin. The plaques were molded on an Arburg (20 ton) press using a barrel temperature of 205° C. and a mold temperature held at 100° F. It was observed that for the unnucleated control resin, the plaque crystallization was characterized by a hazy, rubbery phase which gradually transformed into a clear, rigid phase. The minimum cycle time for these plaques was thus determined to be the minimum time required to eject a transparent plaque without warpage of the part on further cooling. These plaques were formed through the process outlined above with the specific nucleating agents listed in the Table below.

These plaque formulations are, of course, merely preferred embodiments of the inventive article and method and are not intended to limit the scope of this invention. The resultant plaques were also tested for peak crystallization temperatures (by Differential Scanning Calorimetry, or DSC) with a 20° C./min. cooling rate. Generally, a polyolefin such as unnucleated syndiotactic polypropylene has a peak crystallization temperature of about 60–70° C. at most on cooling when comprised of about 70–80% racemic dyads and when measured at a DSC cooling rate of 20° C./min. In order to reduce the amount of time needed to form the final product, as well as to provide the most effective nucleation for the polyolefin, the best nucleator compound added will invariably also provide the highest crystallization temperature for the final syndiotactic PP product. The nucleation composition efficacy, particular polymer onset and peak crystallization temperature ($T_c$), was evaluated by using DSC according to ASTM D-794-85. To measure these temperatures, the specific syndiotactic polypropylene compositions listed below were heated from 25° C. to 220° C. at a rate of 20° C. per minute to produce a molten formulation and held at the peak temperature for 2 minutes. At that time, the temperature was then lowered at a rate of 20° C. per minute until it reached the starting temperature of 25° C. The crystallization temperature was thus measured as the peak maximum during the crystallization exotherm. The clarification performance of the nucleators was measured using ASTM D 1003-92. The stiffness of each sample was measured in accordance with ASTM D790-98, procedure B.

Table 1 below lists the onset and peak crystallization temperatures, haze measurements, and flexural modulus results for the plaques prepared above:

EXPERIMENTAL TABLE 1
Performance of Nucleators in Syndiotactic Polypropylene

| Nucleators | Additive Conc. (%) | Cryst. Temp. Onset (° C.) | Cryst. Temp. Peak (° C.) | Flexural Modulus (MPa) | Haze (%) |
|---|---|---|---|---|---|
| Example 1 | 0.25 | 95 | 77 | 944 | 16 |
| Example 2 | 0.25 | 76 | 71 | 955 | 14 |
| Sodium Benzoate | 0.1 | 70 | 64 | 844 | 23 |
| NA-11 | 0.1 | 70 | 65 | 870 | 9 |
| 3,4-DMDBS | 0.25 | 71 | 63 | 830 | 6 |
| None | — | 70 | 60 | 790 | 13 |

The data shows that the inventive nucleators, and thus the inventive syndiotactic propylene, exhibit significantly higher polymer onset and peak crystallization temperatures and flexural modulus measurements than for the comparative nucleators. In addition, the clarity of the compositions is not drastically affected when Example 1 and 2 are used in the formulation.

To determine the relative amounts of Cell II and Cell III crystal structures within each tested formulation, the first melting transitions were observed after injection molding. The Cell II form melts at about 115° C., while the Cell III form melts at about 126° C. on heating at 20° C./minute. The combined DSC thermograms are shown FIG. 1.

BRIEF DESCRIPTION OF THE DRAWINGS

FIG. 1 is a DSC Thermogram of melting transition of syndiotactic polypropylene with various nucleating agents, as listed.

DETAILED DESCRIPTION OF THE DRAWINGS

In FIG. 1, there is supplied the thermogram for which the amounts of different cell II and cell III crystal structures were formed in various nucleation systems. Such systems are noted in terms of the nucleators utilized. The signficant temperatures for cell II and cell III crystal structures are noted on the x-axis with the range of from about 110–122° representing cell II (the type most highly desired in major amounts for faster processing of the target syndiotactic polypropylene). Cell III is thus represented by temperatures between about 126–131° C. As noted in the thermogram then, the control exhibits a very low temperature in terms of cell II development and a large amount of cell III structures. 3,4-DMDBS and NA-11 are very close in their measurements as well. However, the nucleators from Examples 1 and 2 clearly show not only a shift in the temperature for cell II (thus indicating a larger amount), the peaks for cell II are either roughly even with or far in excess of those for cell III crystal structures. The actual amounts of such crystal structures were thus estimated through triangulation of the peak areas and are tabulated below in Experimental Table 2:

EXPERIMENTAL TABLE 2
Amounts of Cell II and Cell III Crystal Structures in s-PP with Various Nucleating Agents

| Nucleator | Amount Cell II (%) | Amount Cell III (%) |
|---|---|---|
| Control | 25 | 75 |
| 3,4-DMDBS | 29 | 71 |
| NA-11 | 32 | 68 |
| Example 2 | 48 | 52 |
| Example 1 | 65 | 35 |

Thus, the inventive sPP containing Example 1 and 2 exhibited far more of the desired Cell II form than those of the nucleators known in the art.

Having described the invention in detail it is obvious that one skilled in the art will be able to make variations and modifications thereto without departing from the scope of the present invention. Accordingly, the scope of the present invention should be determined only by the claims appended hereto.

That which is claimed is:

1. A method of producing a thermoplastic comprising syndiotactic polypropylene comprising the steps of:
   (a) providing a molten thermoplastic formulation comprising syndiotactic polypropylene;
   (b) introducing to said thermoplastic formulation of step "a" at least one compound selected from the group consisting of compounds conforming to Formula (I), Formula (II), and any mixtures of such compounds, wherein Formula (I) is:

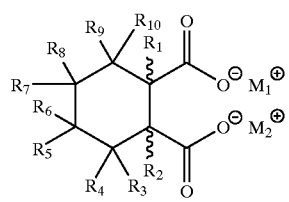

(I)

wherein $M_1$ and $M_2$ are the same or different and are at least one metal cation or H, or $M_1$ and $M_2$ are combined to form a single metal cation, wherein at most one of $M_1$ and $M_2$ is H; wherein $R_1$, $R_2$, $R_3$, $R_4$, $R_5$, $R_6$, $R_7$, $R_8$, $R_9$, and $R_{10}$ are either the same or different and are individually selected from the group consisting of hydrogen, $C_1$–$C_9$ alkyl, hydroxy, $C_1$–$C_9$ alkoxy, $C_1$–$C_9$ alkyleneoxy, amine, and $C_1$–$C_9$ alkylamine, halogens and phenyl; wherein any two vicinal or geminal alkyl groups may be combined to form a carbocyclic ring of up to six carbon atoms; wherein geminal constituents may be the same except that such geminal constituents cannot simultaneously be hydroxy; and wherein geminal constituents may be different from each other, except that such geminal constituents may not be hydroxy and halogen or hydroxy and amine simultaneously;

wherein Formula (II) is:

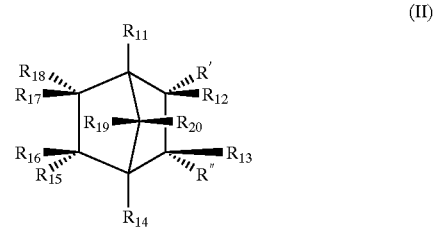

(II)

wherein $R_{11}$, $R_{12}$, $R_{13}$, $R_{14}$, $R_{15}$, $R_{16}$, $R_{17}$, $R_{18}$, $R_{19}$, and $R_{20}$ are individually selected from the group consisting of hydrogen, $C_1$–$C_9$ alkyl, hydroxy, $C_1$–$C_9$ alkoxy, $C_1$–$C_9$ alkyleneoxy, amine, and $C_1$–$C_9$ alkylamine, halogen, phenyl, alkylphenyl, and geminal or vicinal $C_1$–$C_9$ carbocyclic, wherein geminal constituents may be the same except that such geminal constituents cannot simultaneously be hydroxy; and wherein geminal constituents may be different from each other, except that such geminal constituents may not be hydroxy and halogen or hydroxy and amine simultaneously; wherein R' and R" are the same or different and are individually selected from the group consisting of hydrogen, $C_1$–$C_{30}$ alkyl, hydroxy, amine, polyoxyamine, $C_1$–$C_{30}$ alkylamine, phenyl, halogen, $C_1$–$C_{30}$ alkoxy, $C_1$–$C_{30}$ polyoxyalkyl, C(O)—$NR_{21}$C(O), and C(O)O—R'", wherein $R_{21}$ is selected from the group consisting of $C_1$–$C_{30}$ alkyl, hydrogen, $C_1$–$C_{30}$ alkoxy, and $C_1$–$C_{30}$ polyoxyalkyl, and wherein R'" alone or two adjacent R'" groups (such as when R' and R" are the same) are combined to from a single moiety which is selected from the group consisting of hydrogen, a metal ion, an organic cation, polyoxy-$C_2$–$C_{18}$-alkylene, $C_1$–$C_{30}$ alkyl, $C_1$–$C_{30}$ alkylene, $C_1$–$C_{30}$ alkyleneoxy, a steroid moiety, phenyl, polyphenyl, $C_1$–$C_{30}$ alkylhalide, and $C_1$–$C_{30}$ alkylamine; and wherein at least one of R' and R" is either C(O)—$NR_{21}$C(O) or C(O)O—R'"; and
   (c) allowing the resultant formulation of step "b" to cool.

2. The method of claim 1 wherein said thermoplastic comprises at least 70% syndiotacticity.

3. The method of claim 1 wherein said compound added in step "b" conforms with the structure of Formula (I).

4. The method of claim 3 wherein $M_1$ and $M_2$ are combined to form calcium ion, and wherein $R_1$, $R_2$, $R_3$, $R_4$, $R_5$, $R_6$, $R_7$, $R_8$, $R_9$, and $R_{10}$ are all hydrogen.

5. The method of claim 2 wherein said compound added in step "b" conforms with the structure of Formula (II).

6. The method of claim 5 wherein $R_{11}$, $R_{12}$, $R_{13}$, $R_{14}$, $R_{15}$, $R_{16}$, $R_{17}$, $R_{18}$, $R_{19}$, and $R_{20}$ are all hydrogen, R' and R" are both C(O)O—R'", and both R'" groups are sodium.

* * * * *